United States Patent
Tanizawa et al.

(10) Patent No.: US 9,260,098 B2
(45) Date of Patent: Feb. 16, 2016

(54) VACUUM BOOSTER

(71) Applicant: NISSIN KOGYO CO., LTD., Ueda, Nagano (JP)

(72) Inventors: Kiyoaki Tanizawa, Nagano (JP); Shuichi Yatabe, Nagano (JP)

(73) Assignee: NISSIN KOGYO CO., LTD., Nagano (JP)

( * ) Notice: Subject to any disclaimer, the term of this patent is extended or adjusted under 35 U.S.C. 154(b) by 91 days.

(21) Appl. No.: 14/051,081

(22) Filed: Oct. 10, 2013

(65) Prior Publication Data

US 2014/0102843 A1  Apr. 17, 2014

(30) Foreign Application Priority Data

Oct. 12, 2012 (JP) ................... 2012-226908

(51) Int. Cl.
| | |
|---|---|
| *B60T 13/57* | (2006.01) |
| *B60T 13/56* | (2006.01) |
| *B60T 13/567* | (2006.01) |
| *B60T 13/569* | (2006.01) |
| *B60T 13/52* | (2006.01) |

(52) U.S. Cl.
CPC ............... *B60T 13/57* (2013.01); *B60T 13/52* (2013.01); *B60T 13/56* (2013.01); *B60T 13/567* (2013.01); *B60T 13/569* (2013.01)

(58) Field of Classification Search
CPC ......... B60T 13/52; B60T 13/56; B60T 13/57; B60T 13/567; B60T 13/569
USPC ............. 91/369.2, 376 R; 277/309, 351, 353, 277/349
See application file for complete search history.

(56) References Cited

U.S. PATENT DOCUMENTS

| | | | | | |
|---|---|---|---|---|---|
| 3,172,335 | A | * | 3/1965 | Brooks ................ | B60T 13/569 60/555 |
| 4,898,081 | A | * | 2/1990 | Fecher ................ | 92/165 R |
| 5,062,348 | A | * | 11/1991 | Gotoh ................ | F16J 15/3268 91/369.2 |

(Continued)

FOREIGN PATENT DOCUMENTS

| | | |
|---|---|---|
| JP | H02136858 A | 11/1990 |
| JP | H05008159 A | 2/1993 |

(Continued)

OTHER PUBLICATIONS

Japanese Office Action for Related Application No. 2012-226908, drafted Aug. 8, 2014, dated Aug. 14, 2014, 4 pages.

*Primary Examiner* — Thomas Irvin
(74) *Attorney, Agent, or Firm* — Andrew M. Calderon; Roberts Mlotkowski Safran & Cole, P.C.

(57) ABSTRACT

According to one embodiment, a vacuum booster includes a booster shell and a booster piston which divides an interior of the booster shell into a front vacuum chamber and a rear operation chamber. The vacuum booster further includes a valve cylinder in which a control valve controls a communication state of the operation chamber depending on a movement of an input rod. A bearing cylinder is provided on a rear wall of the booster shell. A bearing bush is mounted in the bearing cylinder to support the valve cylinder, and a seal lip is provided at a rear end of the bearing bush integrally therewith to contact elastically closely with the valve cylinder. A grease reservoir is provided in an inner surface of the bearing bush, and an extension grease reservoir is provided in an inner surface of the seal lip.

19 Claims, 4 Drawing Sheets

(56) References Cited

U.S. PATENT DOCUMENTS

| | | | | |
|---|---|---|---|---|
| 5,083,495 A * | 1/1992 | Satoh | ................ | F16J 15/3204 91/369.2 |
| 5,083,496 A * | 1/1992 | Suzuki | ................ | F16J 15/3204 91/369.2 |
| 5,320,024 A * | 6/1994 | Wagner | ................ | B60T 13/569 91/376 R |
| 5,483,866 A * | 1/1996 | Schluter | ................ | B60T 13/72 303/113.4 |
| 5,957,461 A * | 9/1999 | Ulrich | ................ | F16J 15/3224 277/527 |
| 6,345,565 B1 * | 2/2002 | Tsubouchi et al. | ................ | 91/367 |
| 6,718,863 B2 * | 4/2004 | Shinohara | ................ | B60T 13/57 91/376 R |
| 7,063,001 B2 * | 6/2006 | Maligne | ................ | B60T 13/575 91/369.2 |
| 2004/0012254 A1 * | 1/2004 | Michon et al. | ................ | 303/114.3 |
| 2004/0012255 A1 * | 1/2004 | Maligne et al. | ................ | 303/114.3 |
| 2004/0050634 A1 * | 3/2004 | Yatabe | ................ | 188/356 |
| 2005/0211519 A1 * | 9/2005 | Maligne et al. | ................ | 188/356 |

FOREIGN PATENT DOCUMENTS

| | | |
|---|---|---|
| JP | H06057527 B | 3/1994 |
| JP | 2000-302024 A | 10/2000 |
| JP | 2002-255022 A | 9/2002 |
| WO | WO-9002278 | 3/1990 |

* cited by examiner

VACUUM BOOSTER

CROSS-REFERENCE TO RELATED APPLICATION(S)

This application claims priority (priorities) from Japanese Patent Application No. 2012-226908 filed on Oct. 12, 2012, the entire contents of which are incorporated herein by reference.

FIELD

The present invention relates to a vacuum booster for use for a vacuum power assist operation by a brake master cylinder of a motor vehicle and more particularly to an improvement thereon.

BACKGROUND

For example, a general vacuum booster may be configured such that, a booster piston, which divides an interior of a booster shell into a front vacuum chamber which connects to a vacuum source and a rear operation chamber, is accommodated in the booster shell (see JP-H06-057527-B). To this booster piston, a valve cylinder which contains an input rod and a control valve which controls the communication of the operation chamber with the vacuum chamber and the atmosphere as the input rod moves back and forth may be continuously connected. A bearing bush made of an elastic material may be mounted in a bearing cylinder which is provided on a rear wall of the booster shell so as to support slidably an outer circumferential surface of the valve cylinder. A grease reservoir which holds lubrication grease may be provided in an inner circumferential surface of the bearing bush, and a seal lip, which is thinner than the bearing bush, may be provided at a rear end of the bearing bush continuously and integrally therewith so as to be brought into elastic close contact with the outer circumferential surface of the valve cylinder.

In the above-mentioned vacuum booster, the grease reservoir which holds grease is formed in the inner circumferential surface of the elastic bearing bush which slidably supports the outer circumferential surface of the valve cylinder so as to achieve the lubrication of the sliding portion between the bearing bush and the valve cylinder. However, since no grease reservoir exists in an inner circumference of the seal lip, when the valve cylinder slides back and forth, especially, when it slides forwards, a distal end portion of the thin seal lip is taken radially inwards by virtue of friction with the valve cylinder to thereby bring about a stick-slip phenomenon, whereby there may be caused situations in which not only is the smooth sliding of the valve cylinder prevented but also abnormal noise is produced.

SUMMARY

According to a first aspect of the present invention, there is provided a vacuum booster, including:

a booster shell (1);

a booster piston (4) which is accommodated in the booster shell (1) to divide an interior thereof into a front vacuum chamber (2) and a rear operation chamber (3), the front vacuum chamber (2) being connected to a vacuum source (V);

a valve cylinder (10) which is connected to the booster piston (4);

an input rod (20) which is contained inside the valve cylinder (10);

a control valve (38) which is contained inside the valve cylinder (10) to control the operation chamber (3) to communicate with the front vacuum chamber (2) or with the atmosphere depending on a back and forth movement of the input rod (20);

a bearing cylinder (12) which is provided on a rear wall of the booster shell (1);

a bearing bush (9) which is mounted in the bearing cylinder (12) to support slidably an outer circumferential surface of the valve cylinder (10), the bearing bush (9) being made of an elastic material;

a seal lip (13) which is provided at a rear end of the bearing bush (9) integrally therewith to contact elastically closely with the outer circumferential surface of the valve cylinder (10), the seal lip (13) being thinner than the bearing bush (9);

a grease reservoir (35) which is provided in an inner circumferential surface of the bearing bush (9) to retain a lubrication grease (g); and an extension grease reservoir (35') which is provided in an inner circumferential surface of the seal lip (13) continuously with the grease reservoir (35) to hold the same grease (g).

According to a second aspect of the present invention, there is also provided the above-mentioned vacuum booster wherein a plurality of grease grooves (35a) are arranged circumferentially in the bearing bush (9) and the seal lip (13), each of the grease grooves (35a) extending axially from just after a front end of the bearing bush (9) to just before a rear end of the seal lip (13), thereby each functioning as the grease reservoir (35) and the extension grease reservoir (35').

According to a third aspect of the present invention, there is also provided the above-mentioned vacuum booster wherein a bottom portion of the extension grease reservoir (35') is inclined to become shallower as it extends towards a distal end of the seal lip (13).

According to the first aspect, by providing the extension grease reservoir which continuously communicates with the grease reservoir to hold the lubrication grease common to the grease reservoir and the extension grease reservoir in the inner circumferential surface of the seal lip, the valve cylinder is allowed to slide smoothly relative not only to the bearing bush but also to the seal lip by the common lubrication grease. In particular, the occurrence of the stick-slip phenomenon can be prevented and the production of the abnormal noise can be suppressed when the valve cylinder moves forwards. In addition, by allowing the grease reservoir and the extension grease reservoir to hold the common lubrication grease, the maintenance service of the vacuum booster can be improved.

According to the second aspect, by arranging the grease grooves, each extending continuously in the axial direction of the bearing bush and the seal lip so as to start just after the front end of the bearing bush and end just before the rear end of the seal lip to function as the grease reservoir and the extension grease reservoir, in the circumferential direction of the bearing bush and the seal lip, a plurality of rectilinear land portions defined between the plurality of grease grooves so as to extend in the axial direction exhibit a rib effect so as to ensure an axial rigidity of the seal lip, thereby making it possible to allow the seal lip to exhibit its sealing function to a sufficient extent. On top of that, the backward and forward sliding of the valve cylinder causes the lubrication grease in each of the grease grooves to circulate therein, which makes it difficult for the lubrication grease to stay stationary in the grease groove. Consequently, the deterioration of the lubrication grease can be prevented, whereby the sliding portions between the three members of the bearing bush, the seal lip and the valve cylinder can be lubricated effectively for a long period of time.

According to the third aspect, by forming the bottom portion of the extension grease reservoir so as to be inclined so that the extension grease reservoir gets shallower as it extends further towards the distal end of the seal lip, the reduction in rigidity of the seal lip resulting from the formation of the extension grease reservoir can be suppressed to a lower limit, thereby making it possible to increase the effect to prevent the occurrence of the stick-slip phenomenon in the seal lip.

DETAILED DESCRIPTION

An embodiment will be described based on the accompanying drawings.

Figure 1:
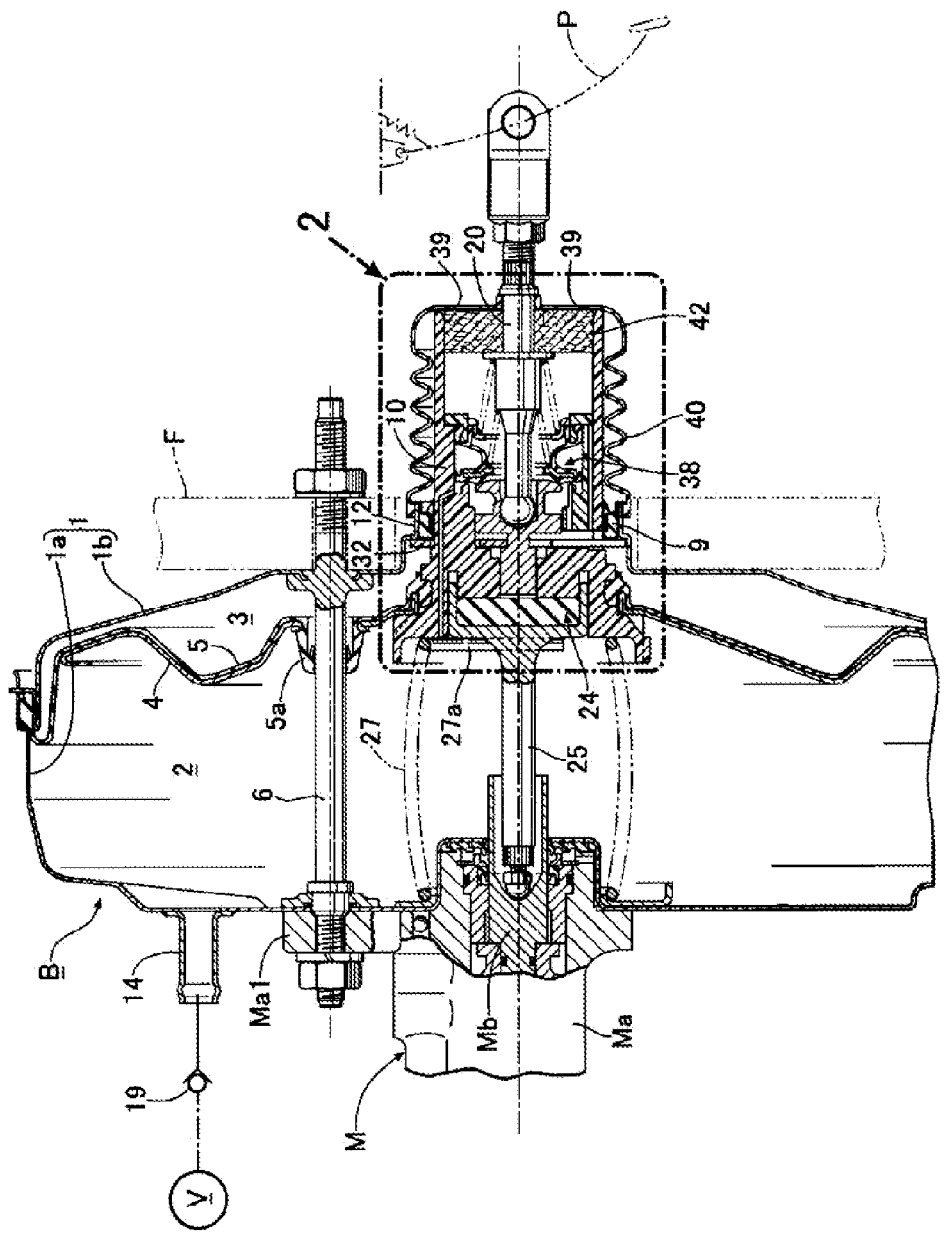
FIG. 1 is a vertical sectional view (a sectional view taken along the line 1-1 in FIG. 3) of a vacuum booster according to an embodiment.
Figure 2:
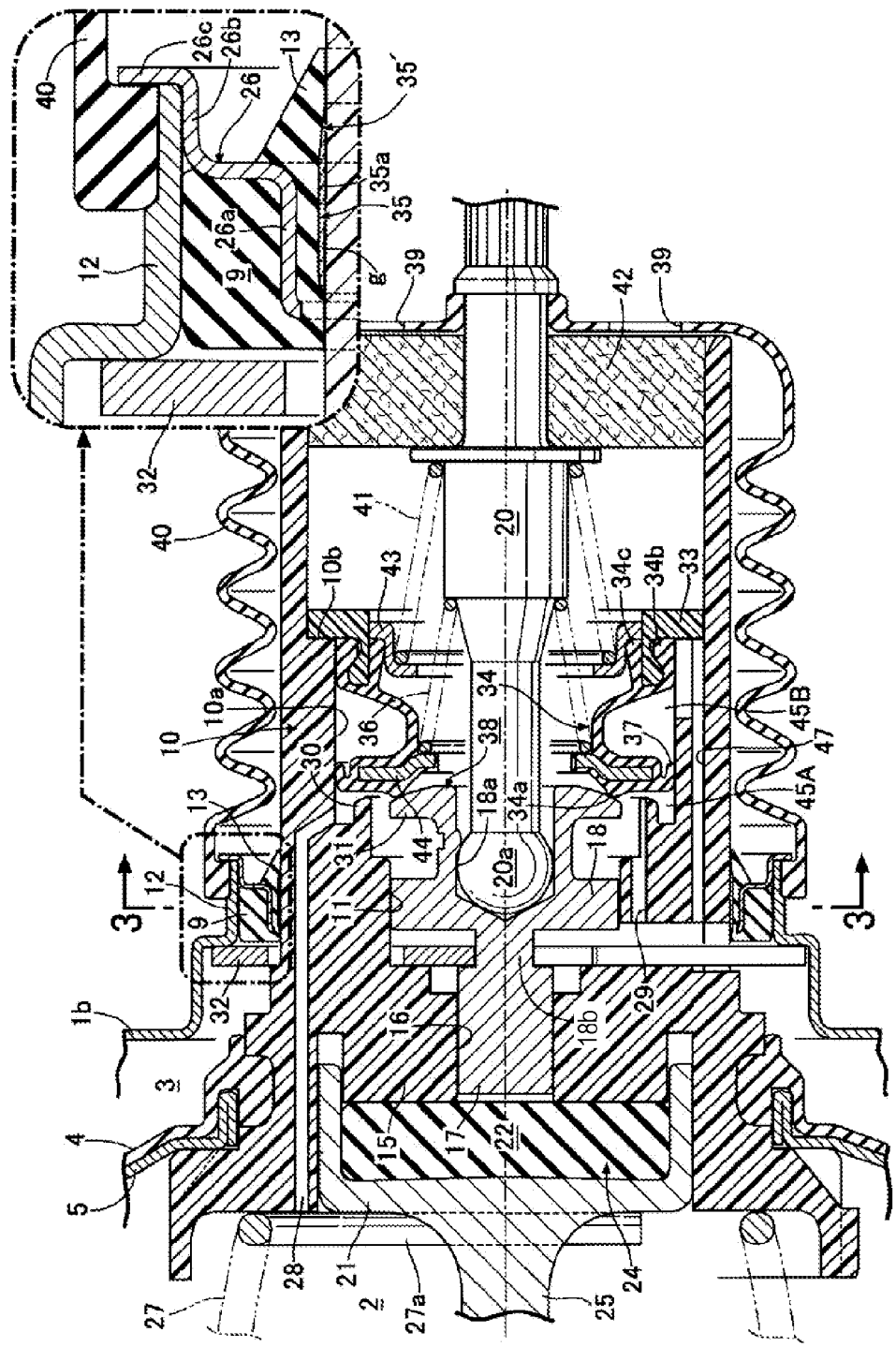
FIG. 2 is an enlarged view of a portion denoted by reference numeral 2 in FIG. 1.

Firstly, in FIGS. 1 and 2, a booster shell 1 of a vacuum booster B includes a front shell half 1a and a rear shell half 1b, which each have a cup-like shape and which are joined together at oppositely facing ends thereof. These front shell half 1a and rear shell half 1b are made of a sheet of steel and are joined together with a pair of steel tie-rods 6 (only one of which is shown in FIG. 1). The pair of tie-rods 6 are disposed so as to lie side by side across a centerline of the booster shell 1. A mounting flange Ma1 of a cylinder body Ma of a master cylinder M is fastened to a front end face of the front shell half 1a by making use of these tie-rods 6. Additionally, the rear shell half 1b is fastened to a front surface of a vehicle body F by making use of the tie-rods 6.

An interior of the booster shell 1 is divided into a front vacuum chamber 2 and a rear operation chamber 3 by a booster piston 4 which is accommodated in the interior of the booster shell 1 so as to reciprocate back and forth and a diaphragm 5 which is superposed on a rear surface of the piston 4 and is held between both the shell halves 1a, 1b. Cylindrical slide seals 5a are formed integrally on the diaphragm 5 so as to pass through a middle portion of the booster piston 4 in an airtight fashion and slide on the corresponding tie-rods 6. The vacuum chamber 2 is connected to a vacuum source V (for example, an interior of an induction manifold of an internal combustion engine) via a vacuum inlet pipe 14 and a check valve 19.

A resin valve cylinder 10 is joined integrally with central portions of the booster piston 4 and the diaphragm 5. This valve cylinder 10 is slidably supported in a bearing cylinder 12, which is provided at a central portion of the rear shell half 1b so as to project to the rear therefrom, via a bearing bush 9.

Figure 3:
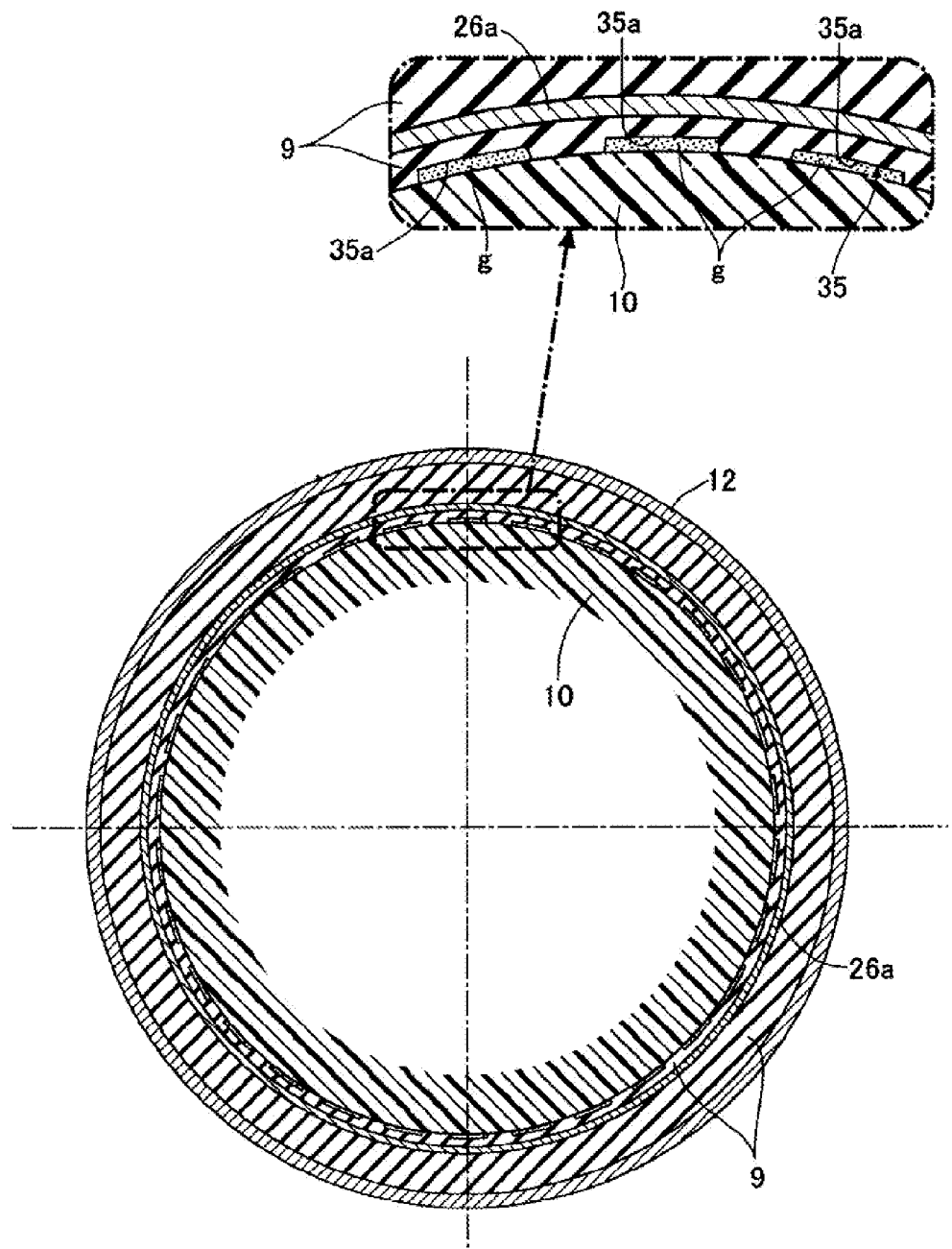
FIG. 3 is a sectional view taken along the line 3-3 in FIG. 2.
Figure 4:
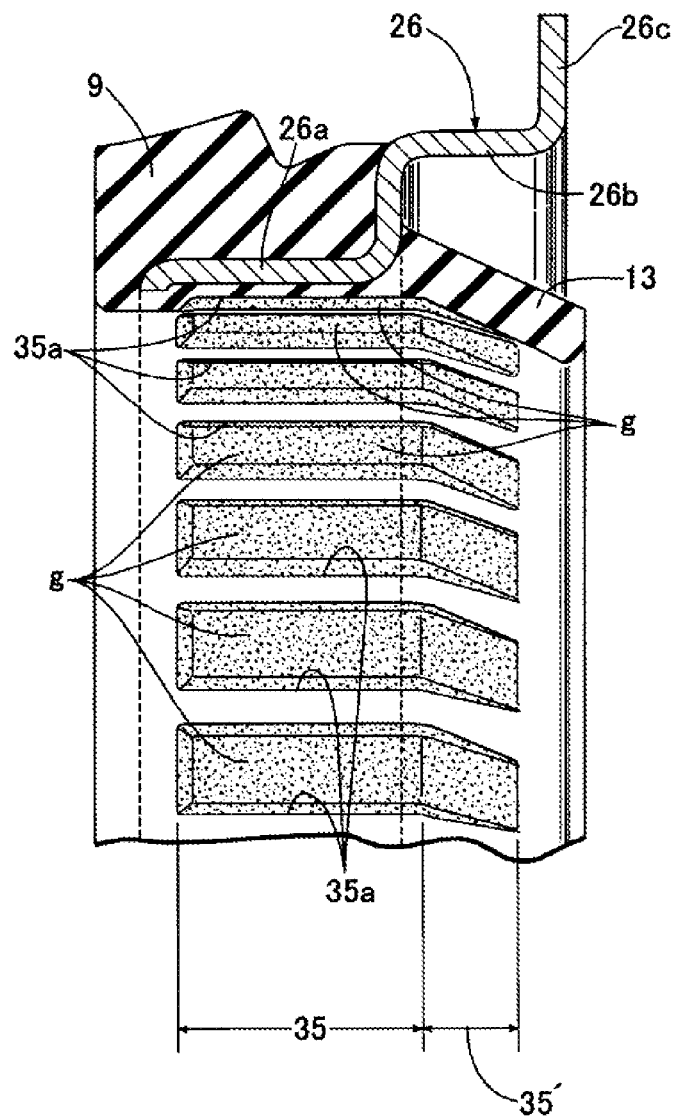
FIG. 4 is an enlarged vertical sectional view showing an inner circumferential surface of a bearing bush with a seal lip alone in a free state.

As clearly shown in FIGS. 2 to 4, the bearing bush 9 is made of an elastic material such as rubber or elastomer and has a square cross section. A seal lip 13, which is formed of the same material as that of the bearing bush 9, is added integrally to a rear end of the bearing bush 9. Similar to the bearing bush 9, the seal lip 13 contacts closely and slidably an outer circumferential surface of the valve cylinder 10. The seal lip 13 is thinner than the bearing bush 9 and is tapered so as to reduce its thickness gradually as it extends towards a distal end thereof, resulting in the seal lip 13 having a triangular cross section. A steel reinforcement ring 26 is mold joined to the bearing bush 9 with the seal lip 13 configured in the way described above. This reinforcement ring 26 includes an annular anchorage portion 26a which is embedded near an inner circumferential surface of the bearing bush 9 after passing between the bearing bush 9 and the seal lip 13, a mounting cylindrical portion 26b which is bent to the rear from an outer circumferential end of the anchorage portion 26a and a stopper flange 26c which projects radially from a rear end of the mounting cylindrical portion 26b. Thus, the reinforcement ring 26 is attached to the bearing cylinder 12 by press fitting the mounting cylindrical portion 26b in an inner circumference of the bearing cylinder 12 and bringing the stopper flange 26c into abutment with a rear end of the bearing cylinder 12. In association with this, the bearing bush 9 is held in a close contact with an inner circumferential surface of the bearing cylinder 12, in which state the outer circumferential surface of the valve cylinder 10 contacts slidably with the inner circumferential surface of the bearing bush 9 and an inner circumferential surface of the seal lip 13.

Grease reservoirs 35, which hold a lubrication grease g, are provided in the inner circumferential surface of the bearing bush 9, and extension grease reservoirs 35' are formed in the inner circumferential surface of the seal lip 13. The extension grease reservoirs 35' communicate continuously with the corresponding grease reservoirs 35 so as to hold the lubrication grease g which is shared by the grease reservoirs 35 and themselves.

As shown clearly in FIG. 4, the grease reservoirs 35 and the extension grease reservoirs 35' are formed by arranging a plurality of grease grooves 35a in a circumferential direction of the bearing bush 9 and the seal lip 13. These grease grooves 35a extend in an axial direction of the bearing bush 9 and the seal lip 13 so as to start just after a front end of the bearing bush 9 and end just before a rear end of the seal lip 13. In forming the grease grooves 35a, bottom portions of the grease grooves 35a which correspond to the extension grease reservoirs 35' are formed so as to be inclined so that the grease grooves 35a get shallower as they extend further towards a distal end of the seal lip 13, that is, a rear end thereof.

Provided in an interior of the valve cylinder 10 are a valve piston 18, an input rod 20 which is coupled to the valve piston 18 and a control valve 38 which controls the communication of the operation chamber 3 with the vacuum chamber 2 and the atmosphere as the input rod 20 moves back and forth. A brake pedal P is coupled to a rear end of the input rod 20 so as to operate it.

The valve piston 18 fits slidably in a guide hole 11 provided in the valve cylinder 10. A reaction-force piston 17 is formed at a front end of the valve piston 18 via a neck portion 18b, while a flange-shaped atmosphere inlet valve seat 31 is formed at a rear end thereof. An annular vacuum inlet valve seat 30 is formed concentrically on the valve cylinder 10 so as to surround the atmosphere inlet valve seat 31.

A coupling hole 18a is provided in the valve piston 18 so as to be opened to a rear end face of the atmosphere inlet valve seat 31. Then, a ball joint 20a formed at a front end of the input rod 20 is fitted in the coupling hole 18a, and part of the valve piston 18 is crimped so as to prevent the dislocation of the ball joint 20a from the coupling hole 18a. In this way, the input rod 20 is coupled to the valve piston 18 so as to swing freely.

An expandable cylindrical valve element 34 is mounted in the valve cylinder 10 by a valve holder 33, and this valve element 34 has at a front end thereof an annular valve portion 34a which cooperates with the vacuum inlet valve seat 30 and the atmosphere inlet valve seat 31. Namely, the whole of the valve element 34 is formed of an elastic material such as rubber. The valve element 34 has at a rear end thereof a mounting bead 34b and an inner bead 34c which is surrounded by the mounting bead 34b, and the mounting bead 34b is held between the annular valve holder 33 and the inner circumferential surface of the valve cylinder 10. A spring seat member 43 adapted to fit in an inner circumferential surface of the valve holder 33 is provided at a rear end of the inner bead 34c so as to be brought into abutment therewith. An input return spring 41 is provided between the spring seat member 43 and the input rod 20 in a compressed fashion, and the input rod 20 is biased in a retreating direction by this input return spring 41. On the other hand, the valve holder 33 is biased to the front by the input return spring 41 and is pressed against an annular shoulder portion 10b on an inner circumference of the valve cylinder 10 to be fixed thereto.

An annular reinforcement plate 44 is embedded in the valve portion 34a of the valve element 34 from an inner circumferential side. An annular seal lip 37, which is bent to the rear, is formed integrally on an outer circumference of the valve portion 34a. The valve portion 34a is disposed to oppositely face the atmosphere inlet valve seat 31 and the vacuum inlet valve seat 30 so as to be seated on those seats. A valve spring 36 is provided between the reinforcement plate 44 of the valve portion 34a and the input rod 20 in a compressed fashion so as to bias the valve portion 34a in a direction in which the valve portion 34a is seated on both the valve seats 30, 31. Thus, the control valve 38 is made up of the vacuum inlet valve seat 30, the atmosphere inlet valve seat 31, the valve element 34 and the valve spring 36.

The seal lip 37 on the outer circumference of the valve portion 34a contacts slidably with an inner circumferential surface of an annular protuberant portion 10a on an inner circumference of the valve cylinder 10. This seal lip 37 defines a front annular chamber 45A which an outer circumferential surface of the vacuum inlet valve seat 30 and a front surface of the valve portion 34a face and a rear annular chamber 45B which a back surface of the valve portion 34a faces in a divided fashion on an inner circumferential side of the annular protuberant portion 10a. Thus, the front annular chamber 45A is closed when the valve portion 34a is seated on the vacuum inlet valve seat 30.

A first port 28 and a second port 29 are provided in the valve cylinder 10. The first port 28 is formed so as to be opened to the vacuum chamber 2 at one end and to the front annular chamber 45A at the other end. The second port 29 is formed so as to communicate with the operation chamber 3 at one end and to be opened between the vacuum inlet valve seat 30 and the atmosphere inlet valve seat 31 at the other end. In addition, a communication hole 47 is provided in the valve cylinder 10 so as to allow the operation chamber 3 to communicate with the rear annular chamber 45B as well.

An expandable boot 40 is attached to a rear end portion of the bearing cylinder 12 and the input rod 20 at ends thereof so as to cover the valve cylinder 10. An atmosphere inlet port 39, which communicates with an inside of the valve element 34, is provided in a rear end portion of the boot 40. A filter 42 which filters air flowing into the atmosphere inlet port 39 is interposed between an outer circumferential surface of the input rod 20 and the inner circumferential surface of the valve cylinder 10. This filter 42 has such flexibility as not to disturb the relative movement of the input rod 20 and the valve cylinder 10.

A key member 32 is attached to the valve cylinder 10 so as to be brought into abutment with a front end portion of the bearing cylinder 12 to regulate a retreating limit of the valve cylinder 10 and the input rod 20.

An operation piston 15 which projects to the front is provided on the valve cylinder 10, and a small-diameter cylinder bore 16 is provided so as to pass through a central portion of the operation piston 15. The reaction-force piston 17 is slidably fitted in the small-diameter cylinder bore 16. A cup member 21 is fitted slidably on an outer circumference of the operation piston 15, and a flat elastic piston 22, which oppositely faces the operation piston 15 and the reaction-force piston 17, is loaded in the cup member 21. As this occurs, a constant gap is made to be defined between the reaction-force piston 17 and the elastic piston 22 when the vacuum booster B is not in operation.

An output rod 25 is continuously provided on a front surface of the cup member 21. Consequently, the output rod 25 is slidably supported on the valve cylinder 10 via the cup member 21. The output rod 25 is continuously connected to a rear end portion of a master piston Mb of the brake master cylinder M which passes through a central portion of the front shell half 1a.

Thus, the operation piston 15, the reaction-force piston 17, the elastic piston 22 and the cup member 21 make up a reaction-force mechanism 24 which feeds part of output from the output rod 25 back to the input rod 20.

Referring to FIG. 1, again, a coil-shaped booster return spring 27, adapted to bias the valve cylinder 10 in the retreating direction, is provided between a front wall of the booster shell 1 and a front end face of the valve cylinder 10 in a compressed fashion. A rear end portion of a wire material which makes up the booster return spring 27 is formed into a dislocation preventive piece 27a which is bent radially inwards so as to be brought into abutment with a front end face of the cup member 21, whereby the dislocation of the cup member 21 from the valve cylinder 10 is prevented.

Next, the function of the embodiment will be described.

With the vacuum booster B being at rest, the key member 32 attached to the valve cylinder 10 is in abutment with the front end of the bearing cylinder 12. By the reaction-force piston 17 being brought into abutment with the key member 32 at a rear end face thereof, the booster piston 4 and the input rod 20 are held at their retreating limits. As this occurs, the atmosphere inlet valve seat 31 is pressed against the valve portion 34a of the valve element 34 while being in close contact therewith to thereby cause the valve portion 34a to be separated slightly from the vacuum inlet valve seat 30. This interrupts the communication between the atmosphere inlet port 39 and the second port 29, while a communication between the first and second ports 28, 29 is established, whereby a vacuum in the vacuum chamber 2 is transmitted to the operation chamber 3 through both the ports 28, 29. Due to this producing the same pressure in both the chambers, the booster piston 4 and the valve cylinder 10 are held in their retreating positions by virtue of the biasing force of the booster return spring 27.

Now then, when the input rod 20 is advanced together with the valve piston 18 against a set load of the input return spring 41 by depressing the brake pedal P with a view to applying the brakes of the vehicle, the valve portion 34a is seated on the vacuum inlet valve seat 30 by virtue of the biasing force of the valve spring 36, and at the same time, the atmosphere inlet valve seat 31 is separated from the valve element 34. This interrupts the communication between the first and second ports 28, 29, and the second port 29 is caused to communicate with the atmosphere inlet port 39 through an inside of the valve element 34.

As a result, the atmosphere which has flowed into the interior of the valve cylinder 10 from the atmosphere inlet port 39 passes through the atmosphere inlet valve seat 31 to be introduced into the operation chamber 3 by way of the second port 29, increasing the pressure in the operation chamber 3 to be higher than the pressure in the vacuum chamber 2. Therefore, by obtaining a forward thrust based on a differential air pressure between the two chambers, the booster piston 4 advances against the force of the booster return spring 27 together with the valve cylinder 10, the operation piston 15, the elastic piston 22, the cup member 21 and the output rod 25, and the output rod 25 drives to advance the master piston Mb. The elastic piston 22 is compressed by virtue of a reaction force produced in association with the driving of the master piston Mb, whereby part of the master piston Mb is caused to protrude into the small-diameter cylinder bore 16. However, since the reaction force is not transmitted to the input rod 20 until the protuberant portion comes into abutment with a front surface of the reaction-force piston 17, the output of the output rod 25 exhibits jumping properties in which the output increases quickly.

When the input rod 20 is operated to advance in this way, a vacuum transmitted from the first port 28 to the front annular chamber 45A of the valve cylinder 10 is applied to the front surface of the valve portion 34a which faces the front annular chamber 45A, whereas the atmospheric pressure which is transmitted from the second port 29 to the rear annular chamber 45B by way of the communication hole 47 is applied to the back portion of the valve portion which faces the rear annular chamber 45B of the valve cylinder 10. Therefore, the valve portion 34a is biased in the direction in which the valve portion 34a is seated on the vacuum inlet valve seat 30 not only by the set load of the valve spring 36 but also by a differential air pressure between the front and rear annular chambers 45A, 45B. Consequently, it is possible to reduce the set load of the valve spring 36 by an amount corresponding to the biasing force produced by the differential pressure. In association with the reduction in the set load of the valve spring 36, it is also possible to reduce the set load of the input return spring 41 with which the input rod 20 is biased in the retreating direction. As a result, since the jumping properties can be obtained by a relatively small initial operation input, the dead strokes of the brake master cylinder M and wheel brakes are eliminated quickly, thereby making it possible to increase the response of each of the wheel brakes.

In addition, in this state, the seal lip 37 on the outer circumference of the valve portion 34a is bent to the rear to contact closely with the inner circumferential surface of the valve cylinder 10. Therefore, the close contact force with which the seal lip 37 is brought into close contact with the valve cylinder 10 is increased by the differential air pressure between the front and rear annular chambers 45A, 45B, thereby making it possible to ensure the gastightness between both the annular chambers 45A, 45B.

After the elastic piston 22 has come into abutment with the reaction-force piston 17, part of the operating reaction force of the output rod 25 is fed back to the input rod 20 via the elastic piston 22, and therefore, the operator can feel the magnitude of the output of the output rod 25. Then, the output of the output rod 25 is increased at a boost ratio which is determined by a ratio of pressure bearing areas of the operation piston 15 and the reaction-force piston 17 which are brought into abutment with the elastic piston 22.

After the output of the output rod 25 has reached a boost limit point where the differential air pressure between the vacuum chamber 2 and the operation chamber 3 becomes the largest, the output of the output rod 25 becomes a sum of the largest thrust of the booster piston 4 based on the differential air pressure described above and the operation input to the input rod 20.

When the depressing force is released from the brake pedal P with a view to releasing the application of the brakes of the vehicle, firstly, the input rod 20 and the valve piston 18 are caused to retreat by the force of the input return spring 41. In association with this, the valve piston 18 separates the valve element 34 from the vacuum inlet valve seat 30 largely while keeping the valve element 34 seated on the atmosphere inlet valve seat 31. Therefore, the operation chamber 3 communicates with the vacuum chamber 2 by way of the second port 29 and the first port 28. As a result, the introduction of the atmosphere into the operation chamber 3 is interrupted, whereas air inside the operation chamber 3 is sucked into the vacuum source V by way of the vacuum chamber 2, and this eliminates the differential pressure between the two chambers. Therefore, the booster piston 4 is also caused to retreat by the spring-back force of the booster return spring 27, whereby the operation of the master cylinder M is canceled. Then, when both end portions of the key member 32 attached to the valve cylinder 10 are brought into front end of the bearing cylinder 12 as has been described above, the booster piston 4 and the input rod 20 are returned to their resting states again.

Incidentally, the valve cylinder 10 which moves back and forth as described above is supported slidably by the bearing bush 9 made of the elastic material which is mounted in the bearing cylinder 12 of the booster shell 1. Therefore, the valve cylinder 10 is permitted to be inclined slightly. Moreover, the grease reservoirs 35 which hold the lubrication grease g are provided in the inner circumferential surface of the bearing bush 9, and the extension grease reservoirs 35' which continuously communicate with the corresponding grease reservoirs 35 so as to hold the lubrication grease g which is shared by the grease reservoirs 35 and themselves are provided in the inner circumferential surface of the seal lip 13. Therefore, the valve cylinder 10 is allowed to slide smoothly not only to the bearing bush 9 but also to the seal lip 13 by the common lubrication grease g which is held by the grease reservoirs 35 and the extension grease reservoirs 35'. In particular, the stick-slip phenomenon which is produced in the seal lip 13 when the valve cylinder 10 moves forwards can be prevented, and the production of abnormal noise can be prevented. In addition, by allowing the grease reservoirs 35 and the extension grease reservoirs 35' to hold the common lubrication grease g, the maintenance service of the vacuum booster can be improved.

In addition, the plurality of grease grooves 35a are arranged in the axial direction of the bush bearing 9 and the seal lip 13 so as to extend continuously in the axial direction of the bearing bush 9 and the seal lip 13 in such a way as to start just after the front end of the bearing bush 9 and end just before the rear end of the seal lip 13 to function as the grease reservoirs 35 and the extension grease reservoirs 35'. Therefore, the plurality of rectilinear land portions defined between the plurality of grease grooves 35a, 35a, ... so as to extend in the axial direction exhibit the rib effect so as to ensure the axial rigidity of the seal lip 13, thereby making it possible to allow the seal lip 13 to exhibit its sealing function to a sufficient extent. On top of that, the backward and forward sliding of the valve cylinder 10 causes the lubrication grease g in each of the grease grooves 35a to circulate therein, which makes it difficult for the lubrication grease g to stay stationary in the grease groove 35a. Consequently, the deterioration of the lubrication grease g can be prevented, whereby the sliding portions between the three members of the bearing bush 9, the seal lip 13 and the valve cylinder 10 can be lubricated effectively for a long period of time.

Further, the bottom portions of the portions of the grease grooves 35a which correspond to the extension grease reservoirs 35' are formed so as to be inclined so that the extension grease reservoir corresponding portions get shallower as they extend further towards the distal end of the seal lip 13, that is, a rear end thereof. Therefore, the reduction in rigidity of the seal lip 13 resulting from the formation of the extension grease reservoirs 35' can be suppressed to a lower limit, thereby making it possible to increase the effect to prevent the occurrence of the stick-slip phenomenon in the seal lip 13.

The invention is not limited to the embodiment described heretofore and hence can be modified with respect to its design variously without departing from the spirit and scope of the invention.

The invention claimed is:

1. A vacuum booster, comprising:
    a booster shell;
    a booster piston which is accommodated in the booster shell to divide an interior thereof into a front vacuum chamber and a rear operation chamber, the front vacuum chamber being connected to a vacuum source;
    a valve cylinder which is connected to the booster piston;
    an input rod which extends in an axial direction, and is contained inside the valve cylinder;
    a control valve which is contained inside the valve cylinder to control the operation chamber to communicate with the front vacuum chamber and with the atmosphere depending on a movement of the input rod in the axial direction;
    a bearing cylinder which is provided on a rear wall of the booster shell;
    a bearing bush which is mounted in the bearing cylinder to support slidably an outer circumferential surface of the valve cylinder, the bearing bush being made of an elastic material;
    a seal lip which is provided at a rear end of the bearing bush integrally therewith to contact elastically closely with the outer circumferential surface of the valve cylinder, the seal lip being thinner than the bearing bush;
    a grease reservoir which is provided in an inner circumferential surface of the bearing bush to retain a lubrication grease; and
    an extension grease reservoir which is provided in an inner circumferential surface of the seal lip and which extends to a distal end of the seal lip as the seal lip tapers toward the distal end,
    wherein the extension grease reservoir is provided in the inner circumferential surface of the seal lip continuously with the grease reservoir to hold the same grease,
    wherein a depth of a bottom portion of the extension grease reservoir is inclined and becomes shallower towards the distal end of the seal lip in the axial direction, and
    wherein the bottom portion of the grease reservoir and the bottom portion of the extension grease reservoir are continuous.

2. The vacuum booster of claim 1,
    wherein a plurality of grease grooves are arranged circumferentially in the bearing bush and the seal lip, each of the grease grooves extending axially from just after a front end of the bearing bush to just before a rear end of the seal lip, thereby each functioning as the grease reservoir and the extension grease reservoir.

3. The vacuum booster of claim 1, wherein the seal lip is tapered so as to reduce its thickness as it extends towards a distal end thereof resulting in the seal lip having a triangular cross section.

4. The vacuum booster of claim 1, further comprising a steel reinforcement ring mold joined to the bearing bush, wherein the reinforcement ring includes:
    an annular anchorage portion which is embedded near an inner circumferential surface of the bearing bush after passing between the bearing bush and the seal lip;
    a mounting cylindrical portion which is bent to a rear from an outer circumferential end of the annular anchorage portion; and
    a stopper flange which projects radially from a rear end of the mounting cylindrical portion.

5. The vacuum booster of claim 4, wherein the reinforcement ring is attached to the bearing cylinder by a press fit of the mounting cylindrical portion in an inner circumference of the bearing cylinder and the stopper flange into abutment with a rear end of the bearing cylinder.

6. The vacuum booster of claim 5, wherein the extension grease reservoir communicates continuously with the grease reservoir so as to hold the grease which is shared by the grease reservoir and the extension grease reservoir.

7. The vacuum booster of claim 6, wherein the grease reservoir and the extension grease reservoir are formed by arranging a plurality of grease grooves in a circumferential direction of the bearing bush and the seal lip.

8. The vacuum booster of claim 7, wherein the grease grooves extend in an axial direction of the bearing bush and the seal lip so as to start just after a front end of the bearing bush and end just before a rear end of the seal lip.

9. The vacuum booster of claim 8, wherein in forming the grease grooves, bottom portions of the grease grooves which correspond to the extension grease reservoirs are formed so as to be inclined so that the grease grooves get shallower as they extend further towards the distal end of the seal lip.

10. The vacuum booster of claim 1, further comprising a sealing lip provided on an outer circumference of a valve portion and contacts slidably with an inner circumferential surface of an annular protuberant portion on the inner circumference of the valve cylinder.

11. The vacuum booster of claim 10, wherein the sealing lip defines a front annular chamber which an outer circumferential surface of a vacuum inlet valve seat and a front surface of the valve portion face and a rear annular chamber which a back surface of the valve portion faces in a divided fashion on an inner circumferential side of the annular protuberant portion.

12. The vacuum booster of claim 11, wherein the front annular chamber is closed when the valve portion is seated on the vacuum inlet valve seat.

13. The vacuum booster of claim 12, further comprising a first port and a second port provided in the valve cylinder,
    wherein the first port is formed so as to be opened to the front vacuum chamber at one end and to the front annular chamber at the other end, and
    wherein the second port is formed so as to communicate with the operation chamber at one end and to be opened between the vacuum inlet valve seat and the atmosphere inlet valve seat at the other end.

14. The vacuum booster of claim 13, wherein the sealing lip on an outer circumference of the valve portion is bent to a rear to contact closely with the inner circumferential surface of the valve cylinder such that a close contact force with which the sealing lip is brought into contact with the valve cylinder is increased by a differential air pressure between the front annular chamber and rear annular chamber, thereby providing gastightness between the front annular chamber and rear annular chamber.

15. The vacuum booster of claim 14, further comprising a communication hole provided in the valve cylinder so as to allow the operation chamber to communicate with the rear annular chamber.

16. The vacuum booster of claim 1, further comprising an atmosphere inlet valve seat pressed against a valve portion of a valve element while being in close contact therewith to cause the valve portion to be separated slightly from a vacuum inlet valve seat which interrupts communication between an atmosphere inlet port and a second port, while a communication between the atmosphere inlet port and the second port is established, whereby a vacuum in the vacuum chamber is transmitted to the operation chamber through both the atmosphere inlet port and the second port.

17. The vacuum booster of claim 16, wherein when the input rod is advanced together with a valve piston, the valve portion is seated on the vacuum inlet valve seat by virtue of a biasing force of a valve spring, and at a same time, the atmosphere inlet valve seat is separated from the valve element, which interrupts communication between the atmosphere inlet port and the second port, and the second port is caused to communicate with the atmosphere inlet port through an inside of the valve element.

18. The vacuum booster of claim 17, wherein atmosphere which has flowed into an interior of the valve cylinder from the atmosphere inlet port passes through the atmosphere inlet valve seat to be introduced into the operation chamber by way of the second port, increasing a pressure in the operation chamber to be higher than a pressure in the vacuum chamber.

19. The vacuum booster of claim 1, further comprising a plurality of rectilinear land portions defined between a plurality of grease grooves so as to extend in an axial direction.

* * * * *